United States Patent [19]

Onori et al.

[11] 3,874,479

[45] Apr. 1, 1975

[54] UNITARY FOOD TRAY MAKE-UP CONVEYOR TABLE APPARATUS

[75] Inventors: Bruno Onori, 4250 N.W. 135th St.; Meredith Luck, both of Opa Locka, Fla.

[73] Assignee: said Meredith Luck to said Bruno Onori, Opa Locka, Fla.

[22] Filed: Nov. 1, 1972

[21] Appl. No.: 302,770

[52] U.S. Cl. .............................. 186/1 D
[51] Int. Cl. .............................. E04h 3/04
[58] Field of Search ....... 186/1 R, 1 B, 1 D; 99/483, 99/443 C; 126/33; 108/21, 22, 24; 312/140.1, 140.2, 140.3, 140.4, 236, DIG. 27, DIG. 32

[56] References Cited
UNITED STATES PATENTS

| | | | |
|---|---|---|---|
| 1,450,434 | 4/1923 | Doerfler | 186/1 R |
| 2,806,604 | 9/1957 | Krasnosky | 108/22 |
| 2,886,395 | 5/1959 | Cahn | 312/236 X |
| 2,894,604 | 7/1959 | McMillan | 186/1 R |
| 2,900,045 | 8/1959 | Conklin et al. | 186/1 R |
| 3,038,986 | 6/1962 | Molitor | 126/33 X |
| 3,162,495 | 12/1964 | Swift | 186/1 R X |
| 3,366,199 | 1/1968 | Chan | 186/1 R |
| 3,478,193 | 11/1969 | Molitor | 312/236 X |
| 3,503,346 | 3/1970 | Chan | 108/22 |
| 3,578,148 | 5/1971 | Pinckard | 186/1 R X |

*Primary Examiner*—Robert B. Reeves
*Assistant Examiner*—Charles A. Marmor
*Attorney, Agent, or Firm*—Gustave Miller

[57] ABSTRACT

This is a unitary food tray make-up conveyor table apparatus for operation by a number of attendants in rapidly loading prepared hot or cold food onto trays for airplane in-flight kitchens, for hospitals, for nursing homes, and anywhere where a variety of foods are to be assembled on a number of trays for later distribution. It consists of a generally rectangular table having a conveyor operable about a food supply island area. A variety of foods are placed in the island area. Heating means and/or cooling means are provided in the island area. The island area food receiving means includes either heated and/or cooled compartments and/or shelves facing the long edges of the rectangular table. The table is supported on support cabinets having legs or casters with brakes and a shelf may connect the bottoms of the cabinets. The conveyor includes a stainless steel roller chain having spaced pins for receiving and detachably supporting stainless steel food tray holders. The conveyor is powered by an adjustable speed motor having a slip clutch automatic safety cut-off which stops the unit should any object get caught between tray holders.

13 Claims, 9 Drawing Figures

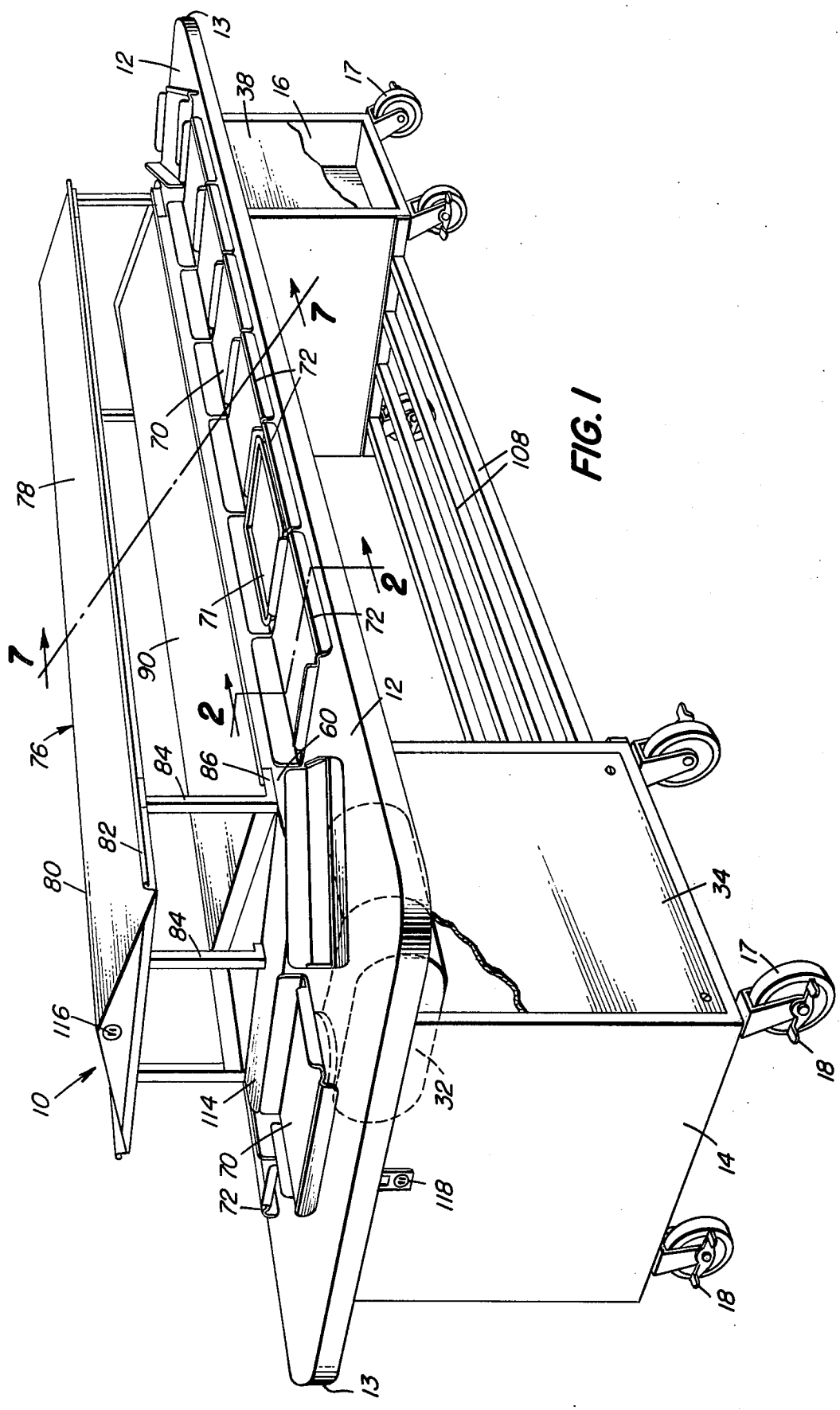

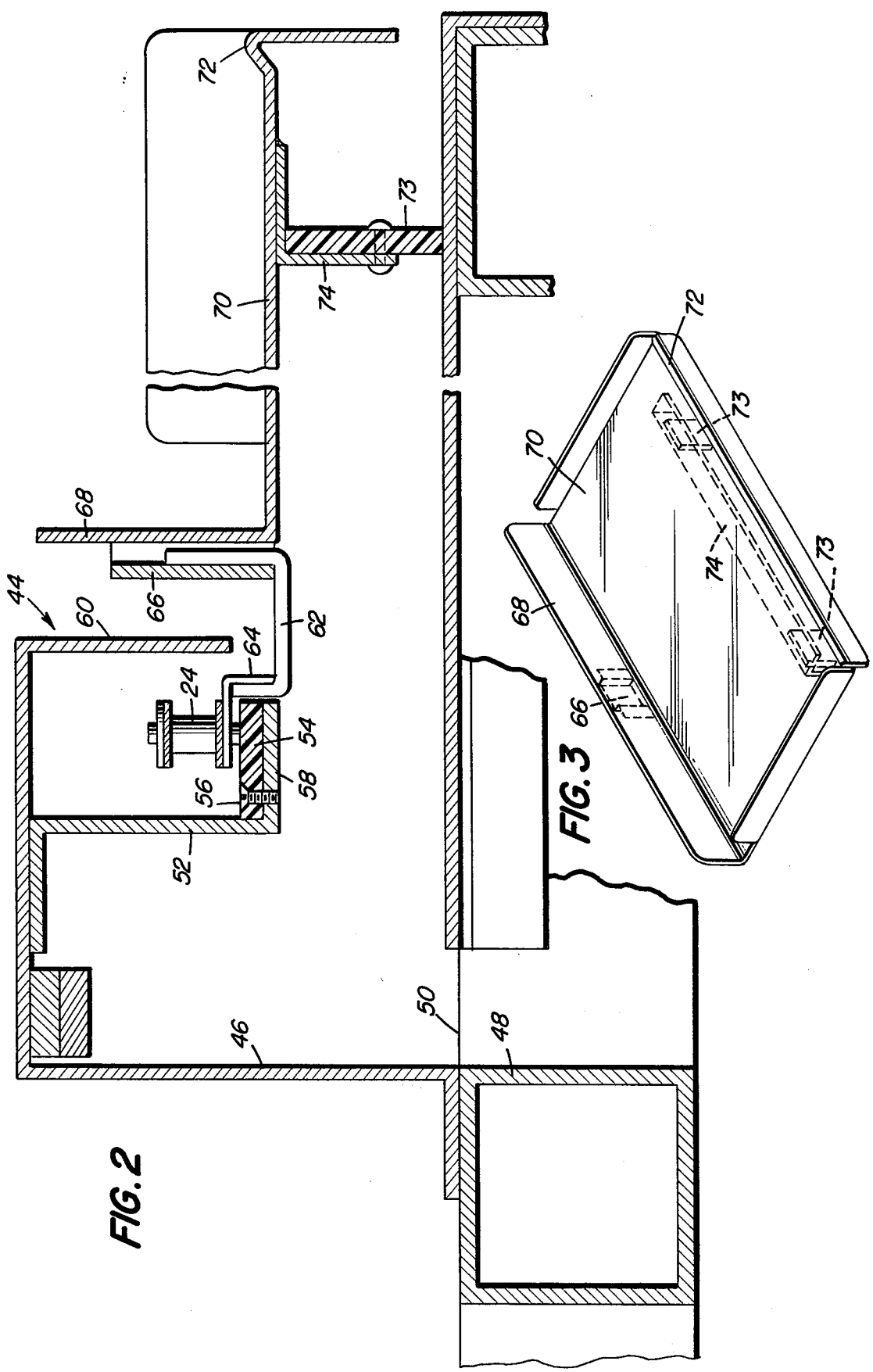

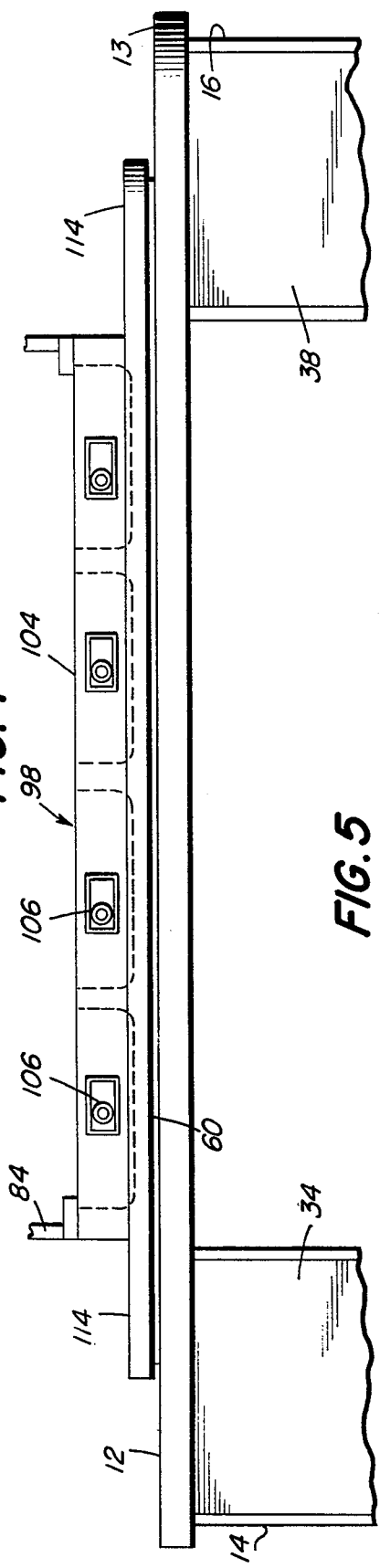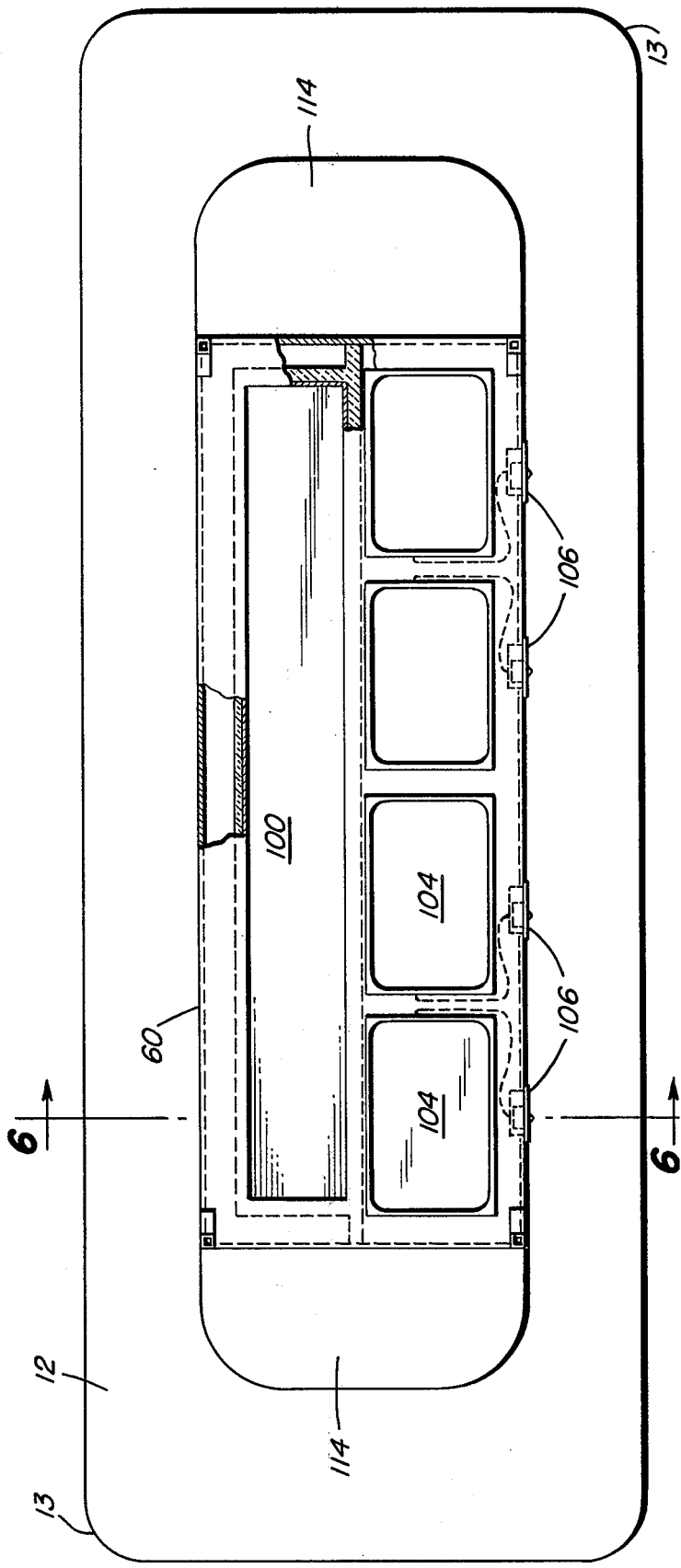

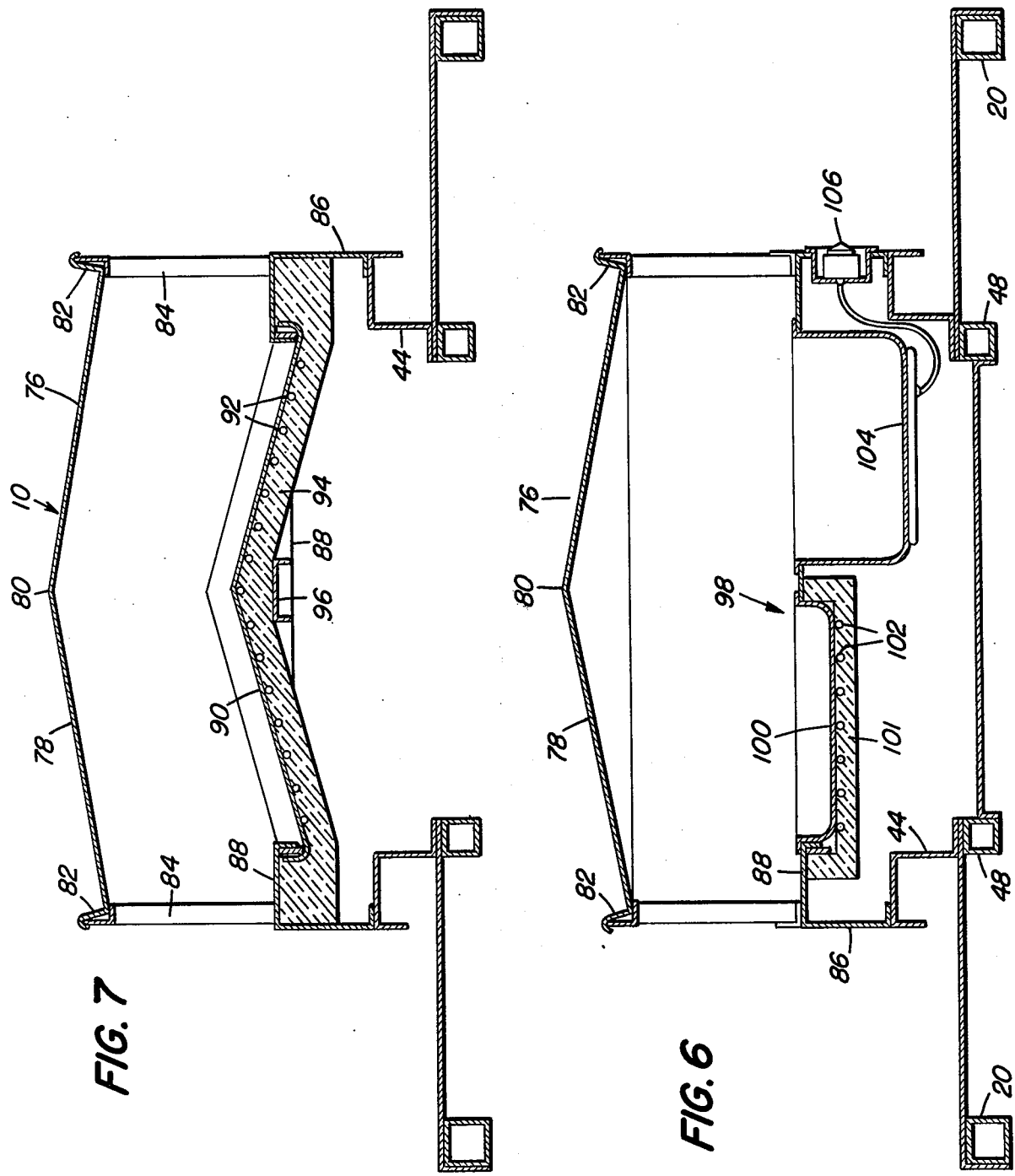

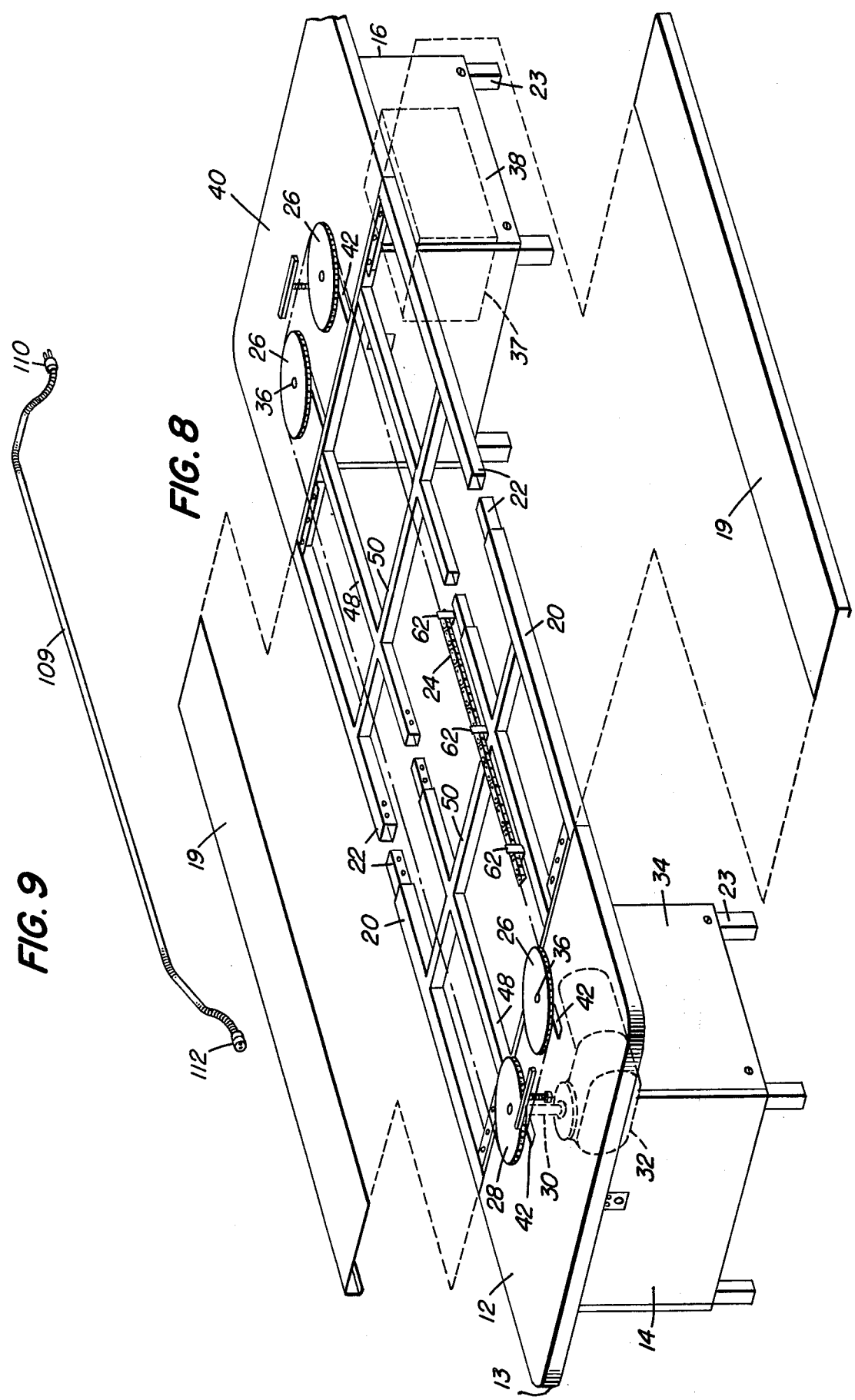

UNITARY FOOD TRAY MAKE-UP CONVEYOR TABLE APPARATUS

OBJECTS OF THE INVENTION

This invention has for an object to provide a space saving conveyor convenient table apparatus for loading a plurality of food trays with a variety of foods in a minimum of time, at the same time including heating or cooling means, as desired, appropriate to the particular foods placed thereon for distribution to the trays.

A further object of this invention is to provide a unique means of loading prepared food onto trays for in-flight kitchens for airplanes or for any type of food operation.

Still a further object of this invention is to provide a complete space saving tray make-up system for hospitals and nursing homes.

Another object of this invention is to provide a unitary food tray make-up conveyor table apparatus having a food supply area around which the conveyor travels carrying the food trays past the food supply area, whereby attendants may manually select and transfer the food from the food supply area to the food trays being made up.

A further object is to provide a conveyor table apparatus having an adjustable speed power supply so that the movement of the trays can be set at a desired speed.

Still another object is to provide a unitary food tray conveyor table apparatus which is mounted on brakable casters for easy movement to a desired location, or on legs, if desired.

A further object of this invention is to provide a unitary food tray make-up conveyor table apparatus which may be of easily sterilizable material attachable and removable food tray holders.

BRIEF DESCRIPTION OF THE DRAWINGS

With the above and related objects in view, this invention consists in the details of construction and combination of parts, as will be more fully understood from the following description, when read in conjunction with the accompanying drawings, in which:

FIG. 1 is a front perspective view of one form of the unitary food tray make-up conveyor table of this invention.

FIG. 2 is an enlarged fragmentary sectional view through the conveyor and attached food tray holder on line 2—2 of FIG. 1.

FIG. 3 is a perspective view of the tray holder.

FIG. 4 is a front view of another form having heated and cooled compartment means for the food supply.

FIG. 5 is a top plan view of FIG. 4.

FIG. 6 is a section on line 6—6 of FIG. 5.

FIG. 7 is a section in line 7—7 of FIG. 1.

FIG. 8 is a perspective, partly exploded view of the chassis, showing that the chassis may be made readily separable for assembly through a door too small to admit the assembled table.

FIG. 9 shows a power connection cable for use with the separable form of FIG. 8.

DETAILED DESCRIPTION OF THE INVENTION

There is shown at 10 unitary food tray make-up conveyor table apparatus of this invention including a generally rectangular table 12, rounded at its corners 13, supported at each end on a hollow cabinet 14 and 16. Each support cabinet 14 and 16, in turn, is supported by conventional casters 17. At least some of the casters 17 have brakes 18 locking the casters 17 against rotation. The table 12, as shown in detail in FIG. 8, consists of table sections 19 supported on square steel hollow tubing 20. While this tubing 20 may be integral, it may also be made in two pieces having telescoping meeting ends 22, so that when the entire table apparatus is too large to be brought into the kitchen, or other place it may be used, it may be brought in in two sections before being assembled at the desired location. Also, legs 23 may be used instead of casters 17, if desired.

All exterior structure is preferably of stainless steel, so that it may be readily sterilized, as by live steam. The essence of the invention is the conveyor 24 which extends about an island area 76 wherein the food is placed. The conveyor 24 is a stainless steel roller chain traveling on four sprocketsgears 26 and 28. Gears 26 are idler gears, and gear 28 is a power gear mounted on a power shaft 30 of a conventional commercially available adjustable speed gear motor 32 suitably supported within the table supporting hollow cabinet 14. A removable cabinet door 34 provides access to the adjustable motor 32 for adjusting the speed as desired. The idler gears 26 are mounted on idler shafts 36 journalled and supported within the cabinet means 14 and 16.

Also supported with the table support cabinet 16 is a conventional refrigerating mechanism 37 providing refrigeration for such of the food supply as desired. A similar access door 38 is provided in the support cabinet 16.

For ease of assembly, the two table end sections 40 each have slots 42 fitting about the shafts 26 and 30. The conveyor chain 24 travels within a chain guard 44 including a support bracket arm 46 on a square hollow tube 48 secured by cross bars 50 between table support bars 20 and 48, thus providing a chassis for the table 12. A Z-bar 52 suitably secured within chain guard 44 suports a nylon slide or track 54, secured thereto by stud screws 56 for supporting the chain 24 when it is slack enough to ride thereon. The foot 58 of Z-bar 52 is spaced from a depending guard apron 60 of guard 44 and thus provides a slot through which extends the J-shaped pin 62, each secured by a right angle connector 64 suitably spaced along the chain 24. The J-shaped pins 62 are flat in crosssection, complementary to clamps or sockets 66 mounted on the middle of the back ledge 68 of a tray holder 70 of a suitable size to receive and support a food tray 71 thereon, held by a nosing or lip 72 against sliding off while going round the corners. Adjacent the front edge, each tray holder 70 is provided on its bottom with a pair of nylon gliders 73 secured on a depending angle iron 74 to ride on the surface of the table 12. As the conveyor chain 24 travels on its sprockets 26 and 28, it travels endlessly about a food receiving island area 76, in which area a variety of foods are to be placed, so that attendants may selectively take portions of food therefrom and place it on the trays 71 traveling thereabout on the tray holders 70.

This island area 76 may be equipped for also keeping the foods thereon in warmed condition, or in chilled condition, or at atmospheric temperatures, or in any combinations of such conditions.

In FIG. 1, the island area 76 includes an upper slanted shelf 78, each shelf 78 slanting from a mid-high line 80 to the lower outer ledges 82 and supported on uprights 84, which in turn rest on frame members 86 supported on the chain guard 44. Also supported on the frame member 86 is a horizontal framework 88 providing support for a lower food supply area which may be in different forms.

In FIGS. 1 and 7, this lower food supply area consists of a double slanted shelf 90 consisting of refrigerator tubing 92 mounted in suitable insulating material 94 further supported along its mid-bottom by a girder 96 suitably supported at its ends on the framework 88.

In FIGS. 4, 5 and 6, the lower food supply area is provided, on its framework 88 along one long side, with a long refrigerated compartment 100 resting on a refrigerator insulator bed 101 having refrigerator tubing 102. In both cases, the refrigerator tubing 92 or 102 is operatively connected in a conventional manner to the refrigerator mechanism 37 in the cabinet support 16. On the other long side, four heatable compartments 104, each with its individual heat control unit 106, are provided for four different heated foods, the heating of course being provided by conventional electrical heating means.

As shown in FIG. 1, a lower shelf consisting of spaced square tubes 108 is provided between the cabinet supports 14 and 16. Obviously, a flat sheet shelf may be substituted for the tubes 108. Suitable electrical cables are provided through selected chassis hollow tubes for the motor 32, the refrigeration mechanism 37, the heat controls 100 and the heat compartments 104.

When the food conveyor table apparatus is made to be assembled at the location to be used, rather than being completely preassembled, an electrical conduit 109, having a plug 110 at one end and a receptacle 112, is provided for connecting the electrical units in the support cabinets 14 and 16.

End shelves 114 supported on the aprons 60 cover the gears 26 and 28. In traveling about the table 12, the conveyor clamps or sockets 66 abut against the guard apron 60 particularly in rounding the end shelves 114.

Electrical receptacles 116 and 118 are provided in the island area shelf 78 and in the cabinet support 14 and are internally connected to all the electrical equipment in this device, so that a conductor may be connected to either, depending on the location where this conveyor table is used.

OPERATION

In operation, this food tray make-up conveyor table apparatus 10 is set up and electrically connected in the desired location, the casters 17 being braked at 18 to keep it stationary, and the heating and/or the refrigerating mechanism are operated to provide desired heating or cooling, according to the foods being provided. Suitably prepared foods are then placed on the slanted shelves 78 and 90, or in the compartments 100 and 104. The tray holders 70 are placed in position on the chain conveyor 24, which is then set to operate at the desired speed, which may be from seven to forty two feet per minute. Attendants then take food from the island area 76 and place it on trays 71 on the tray holders. At one end, empty trays 71 are placed on tray holders 70, from which trays 71 loaded with food are removed and placed in suitable portable cabinets for delivery of the food to the in-flight kitchen for an airplane, to hospital or nursing home rooms, as desired. Four or five attendants are usually sufficient to operate the conveyor table apparatus, and about thirty feet of conveyor is provided in about fifteen feet of floor space. The motor 32 includes a slip clutch automatic safety shut-off switchs, of conventional construction, should any object become caught between tray holders. The tray holders 70 ride against the apron 60 and readily pass about the rounded shelf corners of shelf 114. The removed loaded trays 70 are immediately replaced with empty trays by the same attendant.

ABSTRACT OF THE DRAWINGS

In the drawings, like numbers refer to like parts, and for the purposes of explication, marshalled below are the numbered parts of the improved unitary Food Tray Make-Up Conveyor Table Apparatus.

10 unitary food tray make-up conveyor table apparatus
12 generally rectangular table
13 rounded table corners
14 cabinet providing support for table 12 and containing motor 32
16 other cabinet providing support for table 12 and containing refrigeration mechanism
17 casters
18 caster brakes
19 table side sections
20 steel square tubing
22 telescopic meeting ends of tubing
23 cabinet legs
24 roller chin conveyor
26 idler sprocket gears
28 powered sprocket gear
30 power shaft to gear 26
32 speed adjustable gear motor
34 access door of cabinet 14
36 idler shafts for gears 26
37 conventional refrigeration mechanism
38 access door of cabinet 16
40 table end sections
42 slots in 40 fitting about gear shafts 30 and 36
44 chain conveyor guard
46 support bracket for 44
48 square hollow tube of chassis
50 cross bars of chassis
52 Z-bar of chain guard 44
54 nylon slide or track for chain conveyor 24
56 stud screw securing 54 to 58
58 slide supporting foot of Z-bar 52
60 chain guard apron
62 J-shaped pins on chain conveyor 24
64 right angle connector of 62 to 24
66 clamps or sockets on 70 for receiving 62
68 back ledge of 70
70 tray holder attached by 62 to 24
71 food tray
72 nosing or lip on tray holder 70
73 nylon glider on holders 70
74 angle iron to which 73 is attached
76 island area within 24
78 upper slanted shelf in area 76
80 mid-line of 78
82 ledges of 78
84 upright supports for 78
86 supporting frame members for 84
88 horizontal framework
90 double slanted shelf in area 76
92 refrigerator tubing
94 insulating material of shelf 90
96 girder under 94

98 lower food supply area
100 long refrigerated compartment
101 refrigerator insulator bed
102 refrigerator tubing to 100
104 heatable compartments
106 heat control unit for 104
108 lower shelf tubes
109 electrical conduit
110 electric plug on 109
112 electric receptacle on 109
114 end table shelves supported on aprons 60
116 and 118 electric receptacles for power Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A unitary food tray make-up conveyer apparatus (10) comprising a substantially rectangular table (12), an endless flexible roller chain conveyor (24) operably mounted on said 83.5 (12) in an oval path in a single horizontal plane, gear means (26,28) engaging said roller chain conveyor (24) for operating said conveyor (24), power means (32) operatively connected to said gear means (28), a plurality of spaced pins (62) on said chain conveyor (24), a plurality of food tray holders (70), a pin receiving socket (66) on each said tray holder (70) cooperating one of said chain conveyor pins (62) for pivotally securing one said tray holder (70) on said chain conveyor (24), an island area (76,80) on said table (12) within said oval path of said chain conveyor (24), means (78 & 90; 78,100 & 104) in said island area (76) for receiving and supporting a supply of various foods to be selectively taken therefrom by a plurality of attendants and placed on food trays (71) removably supported on said tray holders (70), said apparatus further comprising a separate cabinet (14,16) at the bottom of each end of said apparatus (10) providing support for said apparatus (10), and temperature controlling means (92; 104,106) for at least some of said food receiving and supporting means (90, 98, 100, 104).

2. The apparatus of claim 1, said power means (32) activating said gear means (28) being located in one said supporting cabinet (14).

3. The apparatus of claim 1 further comprising said power means (32) being adjustable in speed for operating said conveyor (24) at various desired speeds.

4. The apparatus of claim 1, said temperature controlling means further comprising coolant supply means (27) in one said supporting cabinet (16) for supplying coolant to said food receiving and supporting means (92).

5. The apparatus of claim 1, said temperature controlling means further comprising heating means (104,106) for at least some of said food receiving and supporting means (104).

6. The apparatus of claim 1, said food supply and receiving and supporting means in said island area (76) being compartment means (90, 100, 104).

7. The apparatus of claim 6, said compartment means including heated compartment means (104) along one long table edge, and cooled compartment means (100) along the long opposite table edge.

8. The apparatus of claim 1, said food supply receiving and supporting means including slanted shelf means (78).

9. The apparatus of claim 8, said slanted shelf means including a shelf (76,78) slanted toward each of the opposite long sides of said table (12).

10. The apparatus of claim 9, and shelf means (108) extending between and supported on said cabinets (14,16) adjacent their bottoms.

11. The apparatus of claim 1, and cabinet supporting means in the form of legs (23), said apparatus being readily portable.

12. The apparatus of claim 1, and cabinet supporting means in the form of casters (17), said apparatus being readily portable.

13. The apparatus of claim 12, and braking means (18) on said casters (17) for locking them against rotation.

* * * * *

UNITED STATES PATENT AND TRADEMARK OFFICE
CERTIFICATE OF CORRECTION

PATENT NO. : 3,874,479
DATED : April 1, 1975
INVENTOR(S) : Onori et al.

It is certified that error appears in the above-identified patent and that said Letters Patent are hereby corrected as shown below:

In Column 2, Line 17, delete "sprocketsgears" and insert --sprocket gears--;

In Column 5, Line 23, delete "83.5" and insert --table--;

In Column 5, Line 30, insert --adapted for-- after "(70)";

In Column 5, Line 30, insert --with-- after "cooperating".

Signed and Sealed this twenty-seventh Day of April 1976

[SEAL]

Attest:

RUTH C. MASON
*Attesting Officer*

C. MARSHALL DANN
*Commissioner of Patents and Trademarks*